United States Patent
Fan (10) Patent No.: US 12,191,069 B2
(45) Date of Patent: Jan. 7, 2025

(54) HYBRID INDUCTIVE DEVICE

(71) Applicant: Yun-Kuang Fan, Taoyuan (TW)

(72) Inventor: Yun-Kuang Fan, Taoyuan (TW)

( * ) Notice: Subject to any disclaimer, the term of this patent is extended or adjusted under 35 U.S.C. 154(b) by 656 days.

(21) Appl. No.: 17/392,919

(22) Filed: Aug. 3, 2021

(65) Prior Publication Data

US 2022/0165484 A1    May 26, 2022

(30) Foreign Application Priority Data

Nov. 20, 2020  (TW) .................. 109140875
Mar. 26, 2021  (TW) .................. 110203330

(51) Int. Cl.
*H01F 27/29* (2006.01)
*H01F 27/24* (2006.01)

(52) U.S. Cl.
CPC ............ *H01F 27/29* (2013.01); *H01F 27/24* (2013.01)

(58) Field of Classification Search
CPC .......... H01F 27/29; H01F 27/24; H01F 27/38; H01F 27/2823; H01F 17/06; H01F 17/062; H01F 27/006
See application file for complete search history.

(56) References Cited

U.S. PATENT DOCUMENTS

| | | | |
|---|---|---|---|
| 1,785,819 A * | 12/1930 | Silent ................. | H03F 1/08 323/305 |
| 4,118,597 A * | 10/1978 | Proctor ............... | H04M 3/2272 361/45 |
| 4,274,051 A * | 6/1981 | Condon ............... | G01R 19/20 361/45 |
| 5,581,224 A * | 12/1996 | Yamaguchi ........... | H01F 30/16 336/215 |
| 2007/0040644 A1* | 2/2007 | Jang .................. | H01F 30/06 336/215 |
| 2008/0129439 A1* | 6/2008 | Nishikawa .......... | H01F 17/0013 336/225 |
| 2011/0199175 A1* | 8/2011 | Mino .................. | H01F 17/06 336/184 |
| 2017/0018350 A1* | 1/2017 | Blakborn ............ | H01F 27/2895 |
| 2018/0115293 A1* | 4/2018 | Yamamoto .......... | H03H 1/0007 |
| 2018/0366261 A1* | 12/2018 | Bergquist ............ | H02M 7/003 |
| 2019/0103217 A1* | 4/2019 | Pallesgaard .......... | H01F 27/38 |

FOREIGN PATENT DOCUMENTS

| | | |
|---|---|---|
| CN | 111245209 A | 6/2020 |
| JP | 2000348943 A | 12/2000 |
| JP | 2006100465 A | 4/2006 |

* cited by examiner

*Primary Examiner* — Mang Tin Bik Lian
(74) *Attorney, Agent, or Firm* — Rabin & Berdo. P.C.

(57) ABSTRACT

A hybrid inductive device includes a magnetic core and a plurality of coil windings. The magnetic core has a plurality of winding areas. The plurality of coil windings are respectively wound in the plurality of winding areas. A gap is between the coil windings in two adjacent winding areas. A winding direction of the coil winding in each of the plurality of winding areas on the magnetic core is different from winding directions of the coil windings in the adjacent winding areas on the magnetic core. The coil winding in each of the plurality of winding areas is symmetrical to the coil windings in the adjacent winding areas.

6 Claims, 6 Drawing Sheets

HYBRID INDUCTIVE DEVICE

CROSS-REFERENCES TO RELATED APPLICATIONS

This non-provisional application claims priority under 35 U.S.C. § 119(a) to Patent Application No. 109140875 filed in Taiwan, R.O.C. on Nov. 20, 2020 and Patent Application No. 110203330 filed in Taiwan, R.O.C. on Mar. 26, 2021, the entire contents of which are hereby incorporated by reference.

BACKGROUND

Technical Field

The present invention relates to an inductive device, and in particular, to a hybrid inductive device.

Related Art

Nowadays, electronic apparatuses can be found everywhere, and external power supplies are required to ensure their operation. However, power transmission between an electronic apparatus and a power supply often results in electromagnetic interference (e.g., noise). Therefore, an electronic filter (e.g., a line filter) is generally disposed between the electronic apparatus and the power supply to remove the electromagnetic interference. In the line filter, elements for removing the electromagnetic interference are mainly common mode inductors and differential mode inductors, and additional elements for providing other functions (for example, limiting currents or reducing attenuated frequency responses, etc.)

may be mainly non-inductive resistors.

Since focus is placed on miniature and high-frequency line filters, if a magnetic core is provided respectively for a common mode inductor and a differential mode inductor, internal space of the line filter will be occupied, and therefore the requirements for miniature line filters cannot be met. In addition, if different magnetic cores are provided for the common mode inductor and the differential mode inductor, the common mode inductor and the differential mode inductor are unable to form a non-inductive resistor in the line filter due to a voltage drop of coil windings.

SUMMARY

In view of the above, the invention provides a hybrid inductive device, in which a plurality of coil windings are wound on a single magnetic core such that a common mode inductor, a differential mode inductor, and a non-inductive resistor may be formed by a single iron core, thus reducing a size of a circuit of a line filter and reducing occupied internal space of the line filter, thereby meeting the requirements for miniature line filters.

According to some embodiments, the hybrid inductive device includes a magnetic core and a plurality of coil windings. The magnetic core has a plurality of winding areas. The plurality of coil windings are respectively wound in the plurality of winding areas, and a gap is between the coil windings in two adjacent winding areas, where a winding direction of the coil winding in each of the winding areas on the magnetic core is different from winding directions of the coil windings in the adjacent winding areas on the magnetic core, and the coil winding in each of the winding areas is symmetrical to the coil windings in the adjacent winding areas.

Therefore, according to some embodiments, a plurality of coil windings are wound on a single magnetic core, and a winding direction of each of the coil windings is different from winding directions of the adjacent coil windings, so that when a current is generated, a common mode inductor, a differential mode inductor, or a non-inductive resistor is formed by a combination of different coil windings, thus reducing a size of a circuit of a line filter and reducing occupied internal space of the line filter, thereby meeting the requirements for miniature line filters.

DETAILED DESCRIPTION

Figure 1:
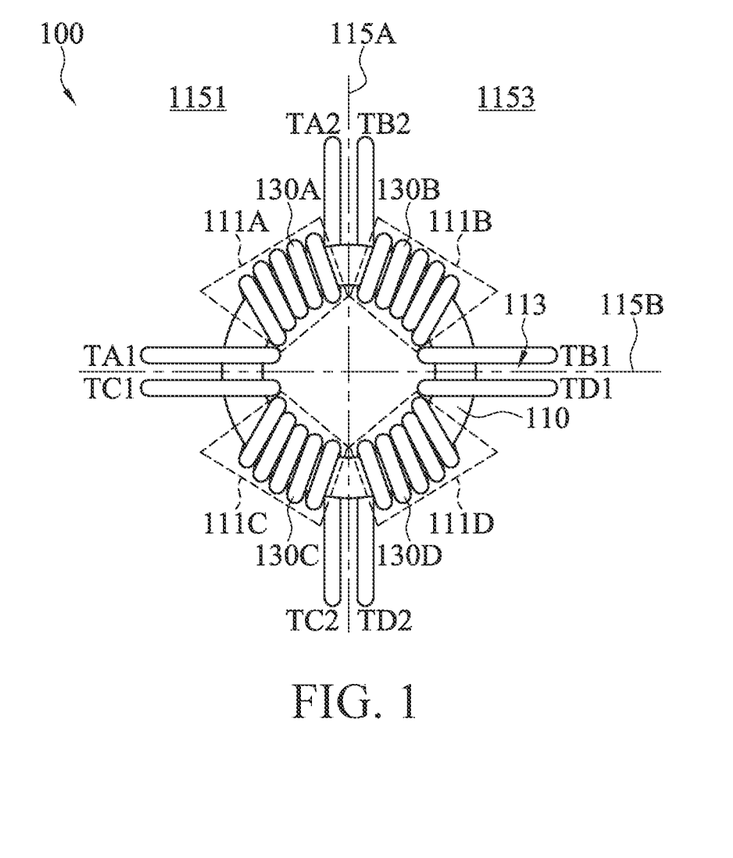
FIG. 1 is a schematic diagram of a hybrid inductive device according to some embodiments of the invention.

Referring to FIG. 1, a schematic diagram of a hybrid inductive device 100 according to some embodiments of the invention is shown. The hybrid inductive device 100 includes a magnetic core 110 and a plurality of coil windings 130A-130D. The magnetic core 110 has a plurality of winding areas 111A-111D. The plurality of coil windings 130A-130D are respectively wound in the plurality of winding areas 111A-111D. Here, the four winding areas 111A-111D and the four coil windings 130A-130D in FIG. 1 are given by way of example, and the invention is not limited thereto. The number of the winding areas 111A-111D and the coil windings 130A-130D may be four or more. The magnetic core 110 may be a sintered magnetic metal oxide composed of an iron oxide mixture, for example, a sintered magnetic manganese-zinc-iron oxide, a nickel-zinc-iron oxide, and the like. The coil windings 130A-130D may be coil windings formed by winding metal wires around the magnetic core 110. The metal wires may be single-core copper wires, multi-core stranded copper wires, and the like.

Referring to FIG. 1, two adjacent winding areas 111A-111D are defined at different positions of the magnetic core 110 and do not overlap each other. The plurality of coil windings 130A-130D are wound in the winding areas 111A-111D in a one-to-one relationship (for example, the coil winding 130A is wound in the winding area 111A; the coil winding 130B is wound in the winding area 111B; the coil winding 130C is wound in the winding area 111C; and the coil winding 130D is wound in the winding area 111D). Therefore, the coil windings 130A-130D are separated by a gap 113. Specifically, the winding area 111A is adjacent to the winding area 111B and the winding area 111C, and the coil winding 130A wound in the winding area 111A is separated from each of the coil winding 130B wound in the winding area 111B and the coil winding 130C wound in the winding area 111C by the gap 113; and the winding area 111D is adjacent to the winding area 111B and the winding area 111C, and the coil winding 130D wound in the winding area 111D is separated from each of the coil winding 130B wound in the winding area 111B and the coil winding 130C wound in the winding area 111C by the gap 113. In other words, the gap 113 is between the adjacent coil windings 130A-130D (that is, the adjacent coil windings 130A-130D are separated from each other by the gap 113). Therefore, stray capacitance between the coil windings 130A-130D wound in two adjacent winding areas 111A-111D (or between the adjacent coil windings 130A-130D) is rendered relatively low, thus enabling the hybrid inductive device 100 to perform both high-frequency filtering and low-frequency filtering.

Referring to FIG. 1, a winding direction of the coil winding 130A-130D in each of the winding areas 111A-111D on the magnetic core 110 is different from winding directions of the coil windings 130A-130D in the adjacent winding areas 111A-111D on the magnetic core 110. For example, the winding area 111A is adjacent to the winding area 111B, and the winding directions of the coil winding 130A and the coil winding 130B are wound on the magnetic core 110 in a direction approaching each other. The winding area 111A is adjacent to the winding area 111C, and the winding directions of the coil winding 130A and the coil winding 130C are wound on the magnetic core 110 in a direction away from each other. In other words, the winding direction of the coil winding 130A is different from the winding directions of the coil winding 130B and the coil winding 130C.

Specifically, as shown in FIG. 1, the coil winding 130A is wound around the center of a left side of the magnetic core 110, upward first from a top surface of the magnetic core 110 to an undersurface of the magnetic core 110 and then from the undersurface of the magnetic core 110 to the top surface of the magnetic core 110, and wound on an upper side of the magnetic core 110 (that is, the winding direction of the coil winding 130A is from the lower left to the upper right). The coil winding 130B is wound around the center of a right side of the magnetic core 110, upward first from a top surface of the magnetic core 110 to an undersurface of the magnetic core 110 and then from the undersurface of the magnetic core 110 to the top surface of the magnetic core 110, and wound on an upper side of the magnetic core 110 (that is, the winding directions of the coil winding 130B is from the lower right to the upper left) to be close to the coil winding 130A. The coil winding 130C is wound around the center of the left side of the magnetic core 110, downward from a top surface of the magnetic core 110 to an undersurface of the magnetic core 110 and then from the undersurface of the magnetic core 110 to the top surface of the magnetic core 110, and wound on a lower side of the magnetic core 110 (that is, the winding directions of the coil winding 130C is from the upper left to the lower right) to keep away from the coil winding 130A.

In some embodiments, referring to FIG. 1, the coil windings 130A-130D in the non-adjacent winding areas 111A-111D may have winding directions parallel to each other. For example, the winding area 111A is not adjacent to the winding area 111D, and the coil winding 130A and the coil winding 130D have winding directions parallel to each other. For example, the coil winding 130D is wound around the center of the right side of the magnetic core 110, downward from a top surface of the magnetic core 110 to an undersurface of the magnetic core 110 and then from the undersurface of the magnetic core 110 to the top surface of the magnetic core 110, and wound on a lower side of the magnetic core 110 (that is, the winding directions of the coil winding 130D is from the upper right to the lower left), and the winding direction of the coil winding 130A is from the lower left to the upper right. In other words, the winding direction of the coil winding 130A on the magnetic core 110 is parallel to the winding direction of the coil winding 130D on the magnetic core 110.

Referring to FIG. 1, the coil winding 130A-130D in each of the winding areas 111A-111D is symmetrical to the coil windings 130A-130D in the adjacent winding areas 111A-111D. For example, adjacent terminals of the coil windings 130A-130D in two adjacent winding areas 111A-111D extend outward from an undersurface of the magnetic core 110 along an axis (or extend outward from a top surface of the magnetic core 110 along the axis), and non-adjacent terminals extend outward from the top surface of the magnetic core 110 along another axis (or extend outward from the undersurface of the magnetic core 110 along the another axis). In some embodiments, the two axes may be perpendicular to each other. For example, the winding area 111A is adjacent to the winding area 111B and the winding area 111C, adjacent terminals (terminals TA2, TB2) of the coil winding 130A in the winding area 111A and the coil winding 130B in the winding area 111B extend outward from the undersurface of the magnetic core 110 along a central axis 115A of the magnetic core 110, and non-adjacent terminals (terminals TA1, TB1) extend outward from the top surface of the magnetic core 110 along another central axis 115B of the magnetic core 110; and adjacent terminals (terminals TA1, TC1) of the coil winding 130A in the winding area 111A and the coil winding 130C in the winding area 111C extend outward from the top surface of the magnetic core 110 along the central axis 115B, and non-adjacent terminals (terminals TA2, TC2) extend outward from the undersurface of the magnetic core 110 along the central axis 115A. The central axis 115A and the central axis 115B are perpendicular to each other. The central axis 115A and the central axis 115B are the axes that pass through the body and the central point of the magnetic core 110.

In some embodiments, referring to FIG. 1, the coil windings 130A-130D in the adjacent winding areas 111A-111D have the same number of coil turns. The coil windings 130A-130D in the adjacent winding areas 111A-111D may have the same number of coil turns since they are symmetrical to each other. For example, the winding area 111A is adjacent to the winding area 111B and the winding area 111C, and the number of coil turns of the coil winding 130A, the coil winding 130B, and the coil winding 130C is five, but the invention is not limited thereto, and the number of coil turns may be more than or less than five; and the winding area 111D is adjacent to the winding area 111B and the winding area 111C, and the number of coil turns of the coil winding 130D, the coil winding 130B, and the coil winding 130C is five, but the invention is not limited thereto, and the number of coil turns may be more than or less than five. In some embodiments, the coil windings 130A-130D in the winding areas 111A-111D may all have the same number of coil turns.

In some embodiments, the magnetic core 110 may be implemented by a closed magnetic core or a non-closed magnetic core. In some embodiments, in case the magnetic core 110 is implemented by a closed magnetic core, the closed magnetic core may be a circular magnetic core, an elliptical magnetic core, a rectangular magnetic core, an EE-shaped magnetic core, or a closed magnetic core of other shapes.

In some embodiments, referring to FIG. 1, the magnetic core 110 is divided into a first area 1151 and a second area 1153 by the central axis 115A, 115B thereof. Here, for the sake of convenience, only the first area 1151 and the second area 1153 into which the magnetic core 110 is divided by the central axis 115A are illustrated in FIG. 1 for description. The coil windings 130A, 130C in the winding areas 111A, 111C in the first area 1151 are respectively symmetrical to the coil windings 130B, 130D in the winding areas 111B, 111D in the second area 1153 with respect to the central axis 115A. For example, the winding area 111A in the first area 1151 is symmetrical to the winding area 111B in the second area 1153 with respect to the central axis 115A, and the winding area 111C in the first area 1151 is symmetrical to the winding area 111D in the second area 1153 with respect to the central axis 115A. In other words, one terminals (terminals TA2, TB2, TC2, TD2) of the coil windings 130A-130D in the winding areas 111A-111D that are close to the central axis 115A extend outward from the undersurface of the magnetic core 110 along the central axis 115A, and the other terminals (terminals TA1, TB1, TC1, TD1) of the coil windings 130A-130D in the winding areas 111A-111D that are away from the central axis 115A extend outward from the top surface of the magnetic core 110 along the central axis 115B, so that the coil winding 130A in the winding area 111A is symmetrical to the coil winding 130B in the winding area 111B with respect to the central axis 115A, and the coil winding 130C in the winding area 111C is symmetrical to the coil winding 130D in the winding area 111D with respect to the central axis 115A.

In some embodiments, referring to FIG. 1, the first area 1151 includes two winding areas 111A, 111C and two coil windings 130A, 130C, and the second area 1153 includes two winding areas 111B, 111D and two coil windings 130B, 130D. As a result, a combination of different coil windings 130A-130D may enable the hybrid inductive device 100 to provide different functions (for example, providing a common mode inductor, a differential mode inductor, or a non-inductive resistor).

In some embodiments, referring to FIG. 1, the terminals TA1-TD2 are configured to couple the coil windings 130A-130D to external circuit elements or electrical signals. For example, the terminals TA1, TA2 are ports for connecting the coil winding 130A to the outside; the terminals TB1, TB2 are ports for connecting the coil winding 130B to the outside; the terminals TC1, TC2 are ports for connecting the coil winding 130C to the outside; and the terminals TD1, TD2 are ports for connecting the coil winding 130D to the outside, so that after the coil windings 130A-130D are coupled to corresponding circuit elements or electrical signals via the terminals TA1-TD2, the hybrid inductive device 100 may be used in a plurality of circuit structures.

Figure 2:
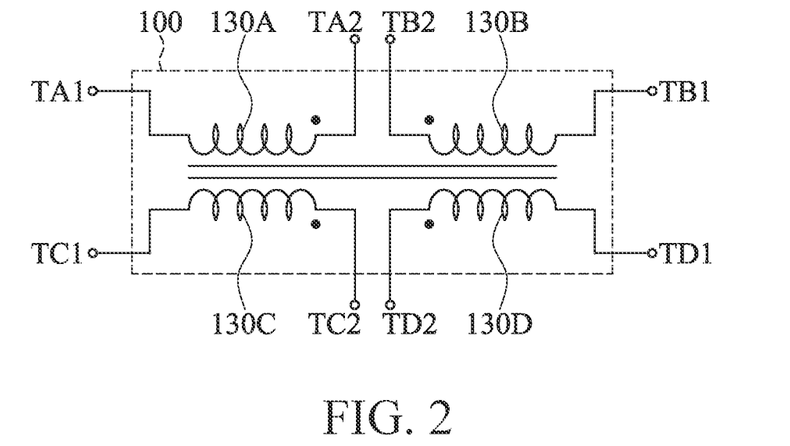
FIG. 2 is a schematic diagram of an equivalent circuit of the hybrid inductive device according to some embodiments of the invention.
Figure 3:
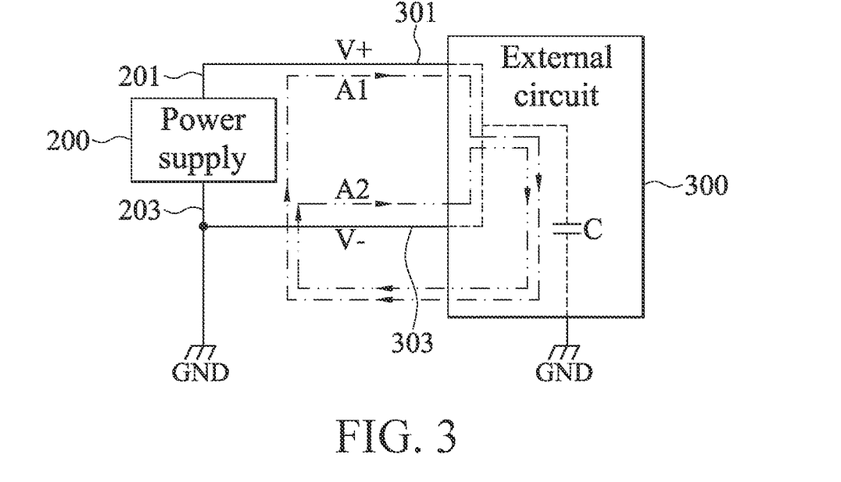
FIG. 3 is a schematic diagram of a common mode noise suppression application circuit of a hybrid inductive device according to some embodiments of the invention.

Referring to FIG. 1 to FIG. 3. FIG. 2 is a schematic diagram of an equivalent circuit of the hybrid inductive device 100 according to some embodiments of the invention.

FIG. 3 is a schematic diagram of a common mode noise suppression application circuit of the hybrid inductive device 100 according to some embodiments of the invention. In some embodiments, a first coil winding and a second coil winding of the coil windings 130A-130D are respectively wound in a first winding area and a second winding area of the winding areas 111A-111D that are adjacent to each other. When currents flow respectively from one adjacent terminals of the first coil winding and the second coil winding to the other terminals of the first coil winding and the second coil winding, the first coil winding and the second coil winding form a common mode inductor.

For example, taking the coil winding 130A, the coil winding 130C, the winding area 111A, and the winding area 111C as the first coil winding, the second coil winding, the first winding area, and the second winding area for description, the terminal TA1 is coupled to a positive power signal V+ from a positive terminal 201 of a power supply 200, the terminal TC1 is coupled to a negative power signal V− from a negative terminal 203 of the power supply 200, the terminal TA2 is coupled to an input (referred to as a first input 301 below) of an external circuit to be filtered (referred to as an external circuit 300 below), and the terminal TC2 is coupled to another input (referred to as a second input 303 below) of the external circuit 300. When the external circuit 300 is coupled to the reference ground signal GND (for example, a housing of the external circuit 300 is grounded), stray capacitance C is generated between the external circuit 300 and the coupled reference ground signal GND, which results in a stray signal (for example, a common mode stray signal) between the positive power signal V+ and the negative power signal V− of the power supply 200 and the reference ground signal GND.

Therefore, when the common mode stray signal occurs, a current (that is, the stray current generated by the positive terminal 201 of power supply 200 through the stray capacitance C) flows from the terminal TA1 to the terminal TA2 of the coil winding 130A and returns to the power supply 200 via the reference ground signal GND of the external circuit 300. Another current (that is, the stray current generated by the negative terminal 203 of the power supply 200 through the stay capacitance C) flows from the terminal TC1 to the terminal TC2 of the coil winding 130C and returns to the power supply 200 via the reference ground signal GND of the external circuit 300. The combination of the two current is indicated as a common mode noise current. For example, the current direction A1 (indicated by a one-dotted chain line in FIG. 3) of the stray current generated by the positive terminal 201 of power supply 200 through the stray capacitance C is the same as the current direction A2 (indicated by a two-dotted chain line in FIG. 3) of the stray current generated by the negative terminal 203 of the power supply 200 through the stay capacitance C. As a result, the coil winding 130A and the coil winding 130C generate magnetic fields in the same direction, which enhances the amount of inductance of the coil winding 130A and the coil winding 130C, that is, enhances inductive reactance for suppressing the common mode current (in other words, the coil winding 130A and the coil winding 130C form a common mode inductor at this time), thus removing noise.

Figure 4:
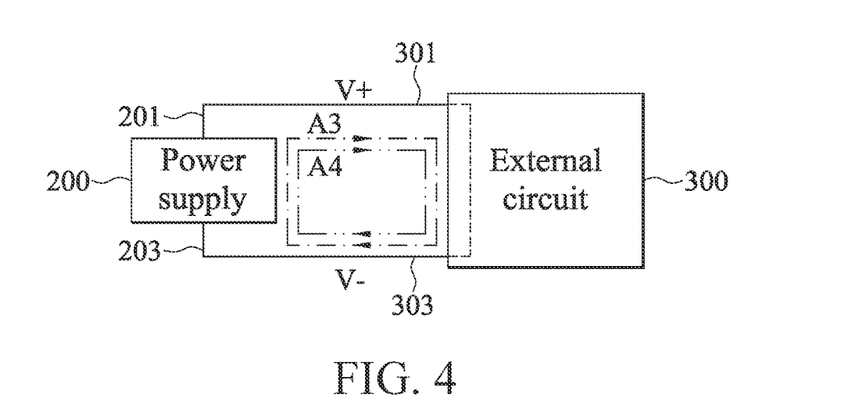
FIG. 4 is a schematic diagram of a differential mode noise suppression application circuit of a hybrid inductive device according to some embodiments of the invention.

Referring to FIG. 1, FIG. 2, and FIG. 4. FIG. 4 is a schematic diagram of a differential mode noise suppression application circuit of the hybrid inductive device 100 according to some embodiments of the invention. In some embodiments, a first coil winding and a second coil winding of the coil windings 130A-130D are respectively wound in a first winding area and a second winding area of the winding areas 111A-111D that are not adjacent to each other. The winding direction of the first coil winding and the winding direction of the second coil winding are parallel to each other, and when currents are respectively applied to the first coil winding and the second coil winding to generate the same magnetic field direction, the first coil winding and the second coil winding form a differential mode inductor.

For example, taking the coil winding 130A, the coil winding 130D, the winding area 111A, and the winding area 111D as the first coil winding, the second coil winding, the first winding area, and the second winding area for description, the terminal TA1 is coupled to a positive power signal V+ from a positive terminal 201 of a power supply 200, the terminal TD2 is coupled to a negative power signal V− from a negative terminal 203 of the power supply 200, the terminal TA2 is coupled to a first input 301 of an external circuit 300, and the terminal TD1 is coupled to a second input 303 of the external circuit 300. Noise is generated between signals (a positive power signal V+ and a negative power signal V−) of a power line, and the noise (that is, a differential mode stray signal) is generally coupled to the power line in series.

When the differential mode stray signal occurs, a current (for example, a differential mode noise current, that is, the current direction A3 (indicated by the two-dot chain line in FIG. 4) of the stray current as the differential mode current is the same as the current direction A4 (indicated by the one-dot chain line in FIG. 4) of the current of the power supply 200) flows from the terminal TA1 to the terminal TA2 of the coil winding 130A, thereby flowing through the external circuit 300, and flows from the external circuit 300 through the terminal TD1 to the terminal TD2 of the coil winding 130D. As a result, the winding direction of the coil winding 130A and the winding direction of the coil winding 130D are parallel to each other (for example, the winding direction of the coil winding 130A is from lower left to upper right, and the winding direction of the coil winding 130D is from upper right to lower left), and generate magnetic fields in the same direction (that is, generate the same magnetic field direction), which enhances the amount of inductance of the coil winding 130A and the coil winding 130D, that is, enhances inductive reactance for suppressing the differential mode current (in other words, the coil winding 130A and the coil winding 130D form a differential mode inductor at this time), thus removing noise.

Figure 5:
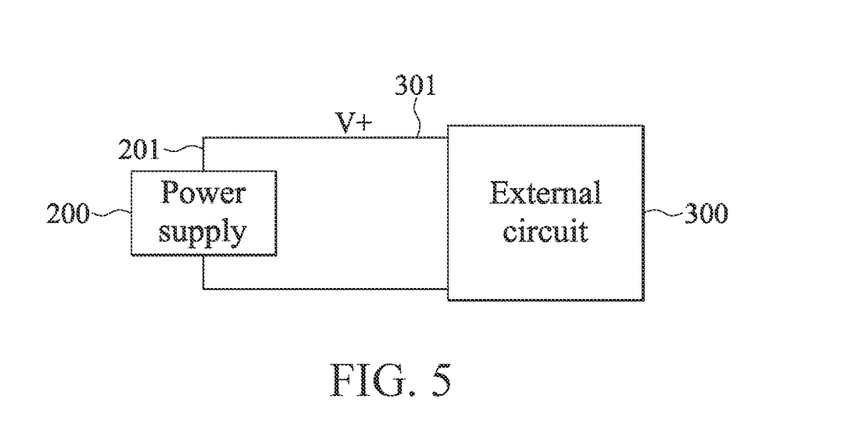
FIG. 5 is a schematic diagram of a non-inductive resistance application circuit of a hybrid inductive device according to some embodiments of the invention.

Referring to FIG. 1, FIG. 2, and FIG. 5. FIG. 5 is a schematic diagram of a non-inductive resistance application circuit of the hybrid inductive device 100 according to some embodiments of the invention. In some embodiments, a first coil winding and a second coil winding of the coil windings 130A-130D are respectively wound in a first winding area and a second winding area of the winding areas 111A-111D that are adjacent to each other. One adjacent terminals of the first coil winding and the second coil winding are coupled to each other, and when a current flows from the other terminal of the first coil winding to the other terminal of the second coil winding, the first coil winding and the second coil winding form a non-inductive resistor.

For example, taking the coil winding 130A, the coil winding 130B, the winding area 111A, and the winding area 111B as the first coil winding, the second coil winding, the first winding area, and the second winding area for description, the terminal TA1 is coupled to a positive power signal V+ from a positive terminal 201 of a power supply 200, and the terminal TB1 is coupled to a first input 301 of an external circuit 300. When it is desired to limit a current of the external circuit 300 and reduce an attenuated frequency response thereof (for example, increase a load thereof), the terminal TA2 is coupled to the terminal TB2 (that is, the terminal TA2 is short-circuited to the terminal TB2), and the current flows from the terminal TA1 through the coil winding 130A and the coil winding 130B to the external circuit 300. Since the coil winding 130A and the coil winding 130B generate magnetic fields in opposite directions, no inductive reactance is generated due to the magnetic fields cancelling out each other. In other words, the coil winding 130A and the coil winding 130B are resistors that do not have inductive reactance (for example, only have resistance of the coils) or only have inductance resulting from small leakage inductance. Stated another way, the coil winding 130A and the coil winding 130B form a substantially non-inductive resistor so as to achieve functions required by the external circuit 300 (for example, limiting currents, reducing attenuated frequency responses, etc.).

In some embodiments, the current may be a direct current (DC) or an alternating current (AC). In other words, the hybrid inductive device 100 may be used in a DC system or an AC system. In some embodiments, the hybrid inductive device 100 may be applicable to a Pi filter or a T filter.

Figure 6:
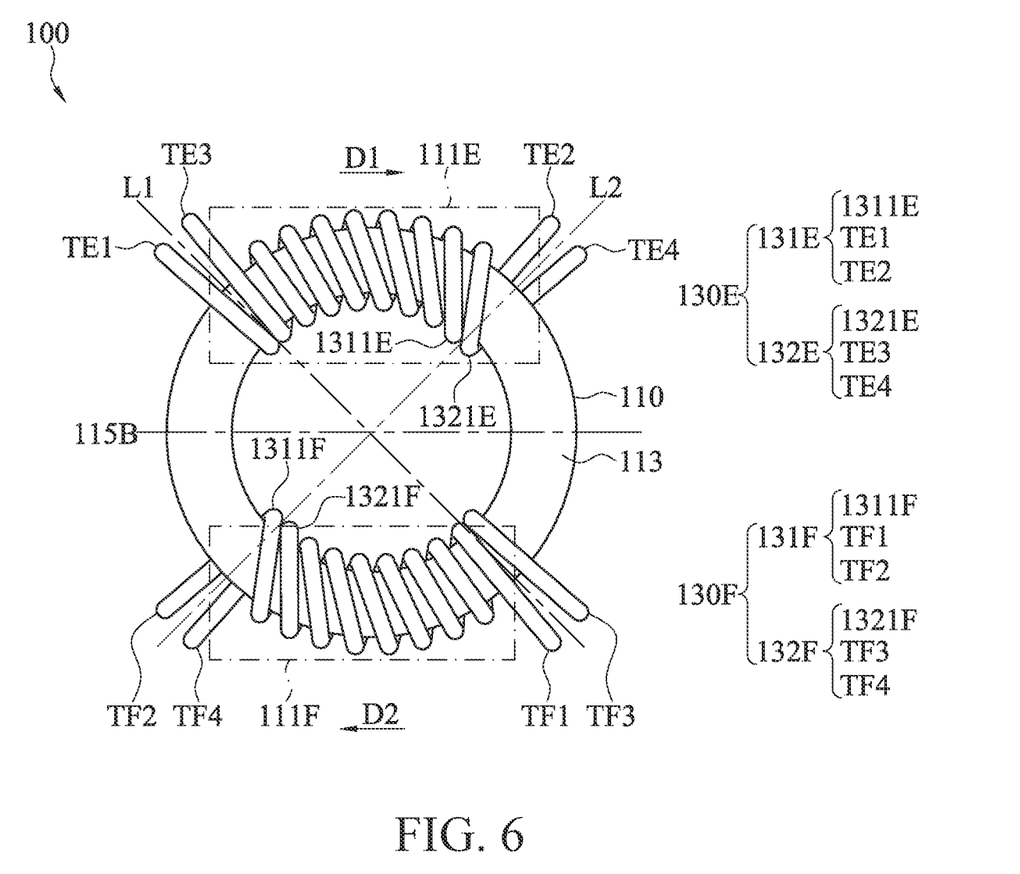
FIG. 6 is a schematic diagram of the hybrid inductive device according to some embodiments of the invention.

Referring to FIG. 6, FIG. 6 is a schematic diagram of the hybrid inductive device 100 according to some embodiments of the invention. In some embodiments, the coil winding 130E-130F in each of the winding areas 111E-111F includes a plurality of coils, but the invention is not limited thereto. The coil winding 130E-130F in each of the winding areas 111E-111F may include only one coil. Each of the coils has a plurality of coil turns, a start terminal extending from a top surface of a magnetic core 110, and an end terminal extending from an undersurface of the magnetic core 110. For example, referring to FIG. 6, the coil winding 130E in the winding area 111E includes a first coil 131E and a second coil 132E. The coil winding 130F in the winding area 111F includes a third coil 131F and a fourth coil 132F. Although FIG. 6 only illustrates that the winding area includes two coils, the invention is not limited thereto, and the winding area may include one or more than two coils.

The first coil 131E has a plurality of first coil turns 1311E, a first start terminal TE1 extending from the top surface of the magnetic core 110, and a first end terminal TE2 extending from the undersurface of the magnetic core 110. The second coil 132E has a plurality of second coil turns 1321E, a second start terminal TE3 extending from the top surface of the magnetic core 110, and a second end terminal TE4 extending from the undersurface of the magnetic core 110. The second coil 131F has a plurality of third coil turns 1311F, a third start terminal TF1 extending from the top surface of the magnetic core 110, and a third end terminal TF2 extending from the undersurface of the magnetic core 110. The fourth coil 132F has a plurality of fourth coil turns 1321F, a fourth start terminal TF3 extending from the top surface of the magnetic core 110, and a fourth end terminal TF4 extending from the undersurface of the magnetic core 110.

In some embodiments, the start terminals of the coils of the same coil winding are integrated together to form a terminal of the coil winding, and the end terminals of the coils of the same coil winding are integrated together to form another terminal of the coil winding.

In some embodiments, the start terminals of the coils of the same coil winding are adjacent to each other, and the end terminals of the coils of the same coil winding are adjacent to each other. For example, referring to FIG. 6, the first start terminal TE1 and the second start terminal TE3 are both located at a left end of the winding area 111E, and the first end terminal TE2 and the second end terminal TE4 are both located at a right end of the winding area 111E. The third start terminal TF1 and the fourth start terminal TF3 are both located at a right end of the winding area 111F, and the third end terminal TF2 and the fourth end terminal TF4 are both located at a left end of the winding area 111F.

In some embodiments, the coils of the same coil winding have the same winding direction on the magnetic core 110. For example, as shown in FIG. 6, the first coil 131E and the second coil 132E of the coil winding 130E all start from the first start terminal TE1 and the second start terminal TE3, first wound from the top surface of the magnetic core 110 to the undersurface of the magnetic core 110 and then from the undersurface of the magnetic core 110 to the top surface of the magnetic core 110, along the left end of the winding area 111E to the right end of the winding area 111E (that is, the winding directions of the first coil 131E and the second coil 132E are from left to right), and ends at the first end terminal TE2 and the second end terminal TE4. The winding directions of the third coil 131F and the fourth coil 132F of the coil winding 130F both start from the third start terminal TF1 and the fourth start terminal TF3, first wound from the top surface of the magnetic core 110 to the undersurface of the magnetic core 110 and then from the undersurface of the magnetic core 110 to the top surface of the magnetic core 110, along the right end of the winding area 111F to the left end of the winding area 111F (that is, the winding directions of the third coil 131F and the fourth coil 132F are from right to left), and ends at the third end terminal TF2 and the fourth end terminal TF4.

In some embodiments, the coil turns of the coils of the same coil winding are parallel to each other. For example, as shown in FIG. 6, each of the first coil turns 1311E of the first coil 131E is respectively parallel to each of the second coil turns 1321E of the second coil 132E. Each of the third coil turns 1311F of the third coil 131F is respectively parallel to each of the fourth coil turns 1321F of the fourth coil 132F.

In some embodiments, the coil turns of the coils of the same coil winding are spaced apart from each other. For example, as shown in FIG. 6, from the left end to the right end of the winding area 111E (that is, from left to right), an arrangement order of the first coil turn 1311E and the second coil turn 1321E is "the first coil turn 1311E, the second coil turn 1321E, the first coil turn 1311E, the second coil turn 1321E, the first coil turn 1311E, the second coil turn 1321E, the first coil turn 1311E, the second coil turn 1321E, and so on". From the right end to the left end of the winding area 111F (that is, from right to left), an arrangement order of the third coil turn 1311F and the fourth coil turn 1321F is "the fourth coil turn 1321F, the third coil turn 1311F, the fourth coil turn 1321F, the third coil turn 1311F, the fourth coil turn 1321F, the third coil turn 1311F, the fourth coil turn 1321F, the third coil turn 1311F, and so on".

Figure 7:
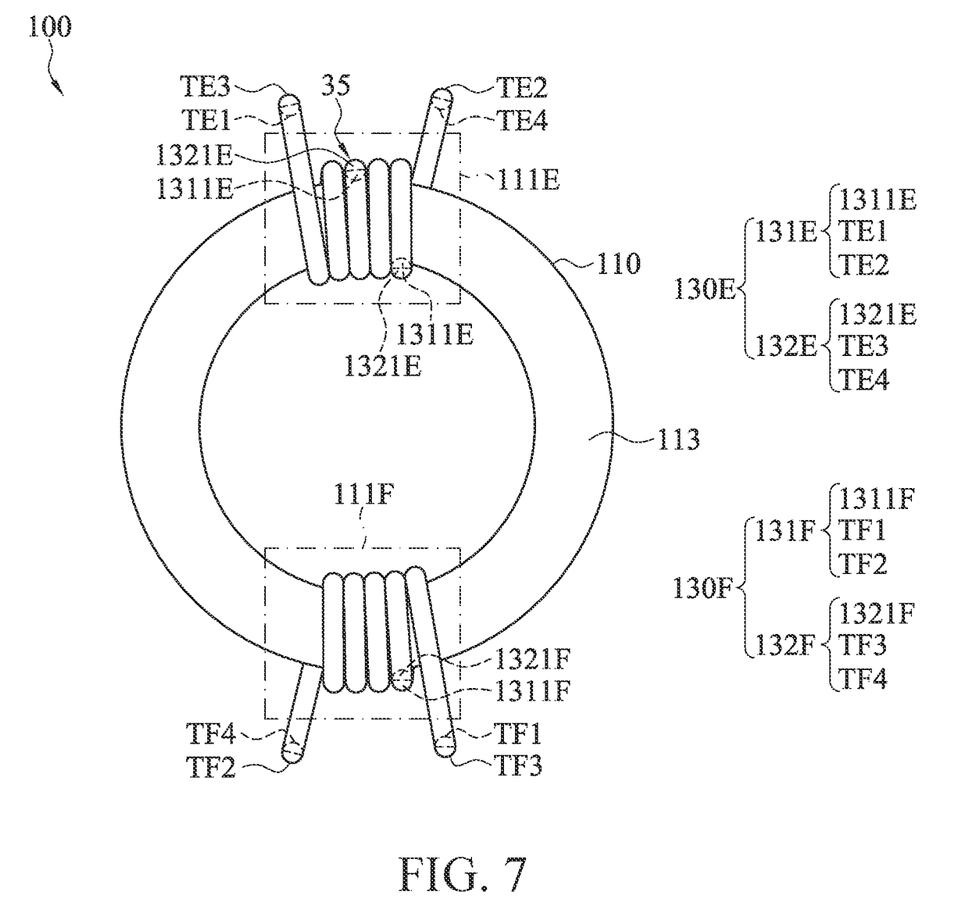
FIG. 7 is a schematic diagram of the hybrid inductive device according to some embodiments of the invention.
Figure 8:
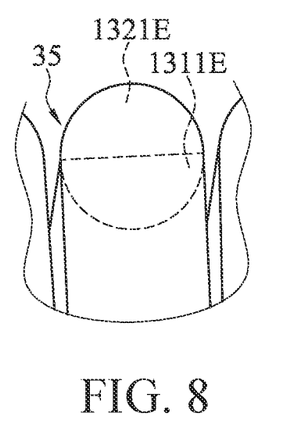
FIG. 8 is a schematic cross-sectional view of a partial structure according to some embodiments of the invention.

Referring to FIG. 7 and FIG. 8. FIG. 7 is a schematic diagram of the hybrid inductive device 100 according to some embodiments of the invention. FIG. 8 is a schematic cross-sectional view of a partial structure 35 according to some embodiments of the invention. In some embodiments, the coil turns of the coils of the same coil winding overlap each other.

For example, the first coil 131E and the second coil 132E of the coil winding 130E may be integrated together to be implemented by a single multi-core stranded wire, and the third coil 131F and the fourth coil 132F of the coil winding 130F may be integrated together to be implemented by a single multi-core stranded wire. In this case, the first coil turn 1311E may overlap above the second coil turn 1321E or below the second coil turn 1321E, and the third coil turn 1311F may overlap above the fourth coil turn 1321F or below the fourth coil turn 1321F. For example, as shown in FIG. 8, the partial structure 35 has the first coil turn 1311E and the second coil turn 1321E, and it can be seen from FIG. 8 that the first coil turn 1311E overlaps above the second coil turn 1321E.

In some embodiments, since the first coil 131E and the second coil 132E of the coil winding 130E may be integrated together to be implemented by a single multi-core stranded wire, the first start terminal TE1 and the second start terminal TE3 overlap, and the first end terminal TE2 overlaps a second end terminal TE4 (for example, the first start terminal TE1 may overlap above the second start terminal TE3 or below the second start terminal TE3, and the first end terminal TE2 may overlap above the second end terminal TE4 or below the second end terminal TE4). Similar to the first start terminal TE1, the second start terminal TE3, the first end terminal TE2, and the second end terminal TE4, the third start terminal TF1 overlaps the fourth start terminal TF3, and the third end terminal TF2 overlaps the fourth end terminal TF4. In other words, the start terminals of the coils of the same coil winding overlap each other, and the end terminals of the coils of the same coil winding overlap each other.

In some embodiments, the winding direction of the coil winding in each of the winding areas on the magnetic core 110 is opposite to the winding directions of the coil windings in the adjacent winding areas on the magnetic core 110. For example, referring to FIG. 6, the winding area 111E is adjacent to the winding area 111F, the first coil 131E and the second coil 132E of the coil winding 130E are wound in the winding area 111E in a first direction D1. The third coil 131F and the fourth coil 132F of the coil winding 130F are wound in the winding area 111F in a second direction D2. The first direction D1 and the second direction D2 are opposite to each other. For example, the first direction D1 is a direction from the left end of the winding area 111E to the right end of the winding area 111E (that is, from left to right), and the second direction D2 is a direction from the right end of the winding area 111F to the left end of the winding area 111F (that is, from right to left).

In some embodiments, the coil turns of the coils of the same coil winding may have the same number of turns. For example, the amount of turns of the first coil turn 1311E and the amount of turns of the second coil turn 1321E are both four, and the amount of turns of the third coil turn 1311F and the amount of turns of the fourth coil turn 1321F are both four, but the present invention is not limited thereto, and the amount of turns may be adjusted depending on actual needs. In this way, the performance of suppressing noise (for example, common mode noise or differential mode noise) or current limiting of the hybrid inductive device 100 can be improved.

Referring to FIG. 6, in some embodiments, a third coil winding and a fourth coil winding of the coil windings are respectively wound in a third winding area and a fourth winding area of the winding areas that are adjacent to each other. The start terminals of the coils of the third coil winding are adjacent to the end terminals of the coils of the fourth coil winding, and the end terminals of the coils of the third coil winding are adjacent to the start terminals of the coils of the fourth coil winding.

In the following embodiment, the coil winding 130E, the coil winding 130F, the winding area 111E, and the winding area 111F are used to describe the third coil winding, the fourth coil winding, the third winding area, and the fourth winding area.

For example, the left end of the winding area 111E is adjacent to the left end of the winding area 111F (specifically, the left end of the winding area 111E and the left end of the winding area 111F are separated by an interval 113), and the right end of the winding area 111E is adjacent to the right end of the winding area 111F (specifically, the right end of the winding area 111E and the right end of the winding area 111F are separated by an interval 113). Since the first start terminal TE1 and the second start terminal TE3 are located at the left end of the winding area 111E, and the third end terminal TF2 and the fourth end terminal TF4 are located at the left end of the winding area 111F, the first start terminal TE1 and the second start terminal TE3 are adjacent to the third end terminal TF2 and the fourth end terminal TF4.

Similarly, since the first end terminal TE2 and the second end terminal TE4 are located at the right end of the winding area 111E, and the third start terminal TF1 and the fourth start terminal TF3 are located at the right end of the winding area 111F, the first end terminal TE2 and the second end terminal TE4 are adjacent to the third start terminal TF1 and the fourth start terminal TF3.

In some embodiments, as shown in FIG. 6, the first start terminal TE1, the second start terminal TE3, the third start terminal TF1, and the fourth start terminal TF3 are located on the same axis (referred to as a first axis L1 below). The first end terminal TE2, the second end terminal TE4, the third end terminal TF2, and the fourth end terminal TF4 are located on the same axis (referred to as a second axis L2 below), and the first axis L1 and the second axis L2 are perpendicular to each other.

The start terminals (that is, the first start terminal TE1, the second start terminal TE3, the third start terminal TF1, and the fourth start terminal TF3) and the end terminals (that is, the first end terminal TE2, the second end terminal TE4, and the third end terminal TF2, and the fourth end terminal TF4) are coils (that is, the first coil 131E, the second coil 132E, the third coil 131F, and the fourth coil 132F) for being coupled to an external circuit element or an element for electrical signals. For example, the first start terminal TE1 and the first end terminal TE2 are terminals for connecting the first coil 131E to the outside; the second start terminal TE3 and the second end terminal TE4 are terminals for connecting the second coil 132E to the outside; the third start terminal TF1 and the third end terminal TF2 are terminals for connecting the third coil 131F to the outside; and the fourth start terminal TF3 and the fourth end terminal TF4 are terminals for connecting the fourth coil 132F to the outside. In this way, the coils are coupled to corresponding circuit elements or electrical signals via the start terminals and the end terminals, the hybrid inductive device 100 may be used in a plurality of circuit structures. Here, the start terminal and the end terminal represent the beginning and end of the coil winding, rather than restricting the direction in which the current passes.

Figure 9:
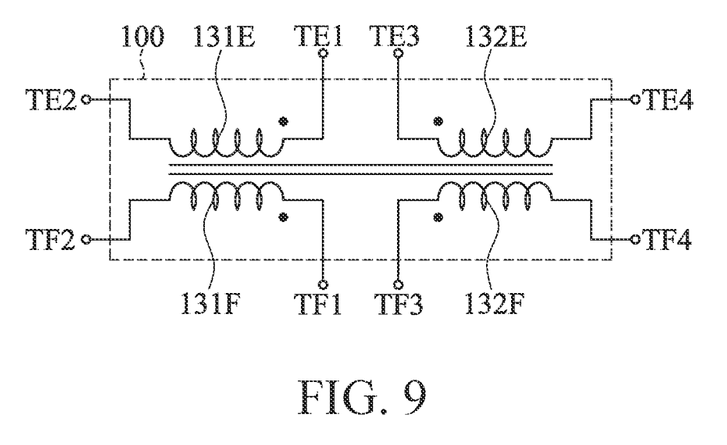
FIG. 9 is a schematic diagram of an equivalent circuit of the hybrid inductive device according to some embodiments of the invention.

Referring to FIG. 3, FIG. 6, and FIG. 9. FIG. 9 is a schematic diagram of an equivalent circuit of the hybrid inductive device 100 according to some embodiments of the invention. When currents flow from the end terminal (that is, the first end terminal TE2) of the first coil (that is, the first coil 131E) of the coils of the third coil winding (that is, the coil winding 130E) and the end terminal (that is, the third end terminal TF2) of the third coil (that is, the third coil 131F) of the coils of the fourth coil winding (that is, the coil winding 130F) to the start terminal of the first coil (that is, the first start terminal TE1) and the start terminal of the third coil (that is, the third start terminal TF1), the first coil and the third coil form a common mode inductor.

For example, the first end terminal TE2 of the first coil 131E is coupled to the positive power signal V+ of the positive terminal 201 of the power supply 200, and the third end terminal TF2 of the third coil 131F is coupled to the negative power signal V− of the negative terminal 203 of the power supply 200. The first start terminal TE1 of the first coil 131E is coupled to the first input 301 of the external circuit 300, and the third start terminal TF1 of the third coil 131F is coupled to the second input 303 of the external circuit 300. When common mode noise occurs, a noise current from the common mode noise current flows from the first end terminal TE2 to the first start terminal TE1 of the first coil 131E and returns to the power supply 200 via the reference ground signal GND of the external circuit 300. Another noise current from the common mode noise current flows from the third end terminal TF2 to the third start terminal TF1 of the third coil 131F and returns to the power supply 200 via the reference ground signal GND of the external circuit 300. As a result, the first coil 131E and the third coil 131F generate magnetic fields in the same direction, which enhances the amount of inductance of the first coil 131E and the third coil 131F, that is, enhances inductive reactance for suppressing the common mode current (in other words, the first coil 131E and the third coil 131F form a common mode inductor at this time), thus removing noise.

Similarly, in some embodiments, when currents flow from the start terminal (that is, the second start terminal TE3) of the second coil (that is, the second coil 132E) of the coils of the third coil winding (that is, the coil winding 130E) and the start terminal (that is, the fourth start terminal TF3) of the fourth coil (that is, the fourth coil 132F) of the coils of the fourth coil winding (that is, the coil winding 130F) to the end terminal of the second coil (that is, the second end terminal TE4) and the end terminal of the fourth coil (that is, the fourth end terminal TF4), the second coil and the fourth coil form a common mode inductor. Here, since the second coil 132E and the fourth coil 132F form the common mode inductor in the same manner as the first coil 131E and the third coil 131F, for brevity of the present disclosure, details are not described herein.

Referring to FIG. 4, FIG. 6, and FIG. 9. When currents flow from the end terminal (that is, the first end terminal TE2) of the first coil (that is, the first coil 131E) of the coils of the third coil winding (that is, the coil winding 130E) and the end terminal (that is, the fourth end terminal TF4) of the fourth coil (that is, the fourth coil 132F) of the coils of the fourth coil winding (that is, the coil winding 130F) to the start terminal of the first coil (that is, the first start terminal TE1) and the start terminal of the fourth coil (that is, the fourth start terminal TF3), the first coil and the fourth coil generate the same magnetic field direction through the current to form a differential mode inductor.

For example, the first end terminal TE2 is coupled to the positive power signal V+ from the positive terminal 201 of the power supply 200, the fourth start terminal TF3 is coupled to the negative power signal V− from the negative terminal 203 of the power supply 200, the first start terminal TE1 is coupled to the first input 301 of the external circuit 300, and the fourth end terminal TF4 is coupled to the second input 303 of the external circuit 300. When differential mode noise occurs, the differential mode noise current flows from the first end terminal TE2 to the first start terminal TE1 of the first coil 131E and then flows through the external circuit 300, and then the differential mode noise current flows from the external circuit 300 to the fourth start terminal TF3 of the fourth coil 132F through the fourth end terminal TF4, so that the first coil 131E and the fourth coil 132F generate magnetic fields in the same direction (that is, generate the same magnetic field direction), which enhances the amount of inductance of the first coil 131E and the fourth coil 132F, that is, enhances inductive reactance for suppressing the differential mode current (in other words, the first coil 131E and the fourth coil 132F form a differential mode inductor at this time), thus removing noise.

Similarly, in some embodiments, when currents flow from the end terminal (that is, the second end terminal TE4) of the second coil (that is, the second coil 132E) of the coils of the third coil winding (that is, the coil winding 130E) and the end terminal (that is, the third end terminal TF2) of the fourth coil (that is, the third coil 131F) of the coils of the fourth coil winding (that is, the coil winding 130F) to the start terminal of the second coil (that is, the second start terminal TE3) and the start terminal of the third coil (that is, the third start terminal TF1), the second coil and the third coil generate the same magnetic field direction through the current to form a differential mode inductor. Here, since the second coil 132E and the third coil 131F form the differential mode inductor in the same manner as the first coil 131E and the fourth coil 132F, for brevity of the present disclosure, details are not described herein.

Referring to FIG. 5, FIG. 6, and FIG. 9. The start terminals (that is, the first start terminal TE1 and the second start terminal TE3) of the coils (that is, the first coil 131E and the second coil 132E) of the third coil winding (that is, the coil winding 130E) are coupled to each other, and when a current flows into the end terminal (for example, the first end terminal TE2 or the second end terminal TE4) of one of the coils of the third coil winding, the coils of the third coil winding form a non-inductive resistor through the current.

For example, the first end terminal TE2 is coupled to the positive power signal V+ from the positive terminal 201 of the power supply 200, and the second end terminal TE4 is coupled to the first input 301 of the external circuit 300. When it is desired to limit a current of the external circuit 300 and reduce an attenuated frequency response thereof (for example, increase a load thereof), the first start terminal TE1 is coupled to the second start terminal TE3 (that is, the first start terminal TE1 is short-circuited to the second start terminal TE3), and the current flows from the first end terminal TE2 through the first coil 131E and the second coil 132E to the external circuit 300. Since the first coil 131E and the second coil 132E generate magnetic fields in opposite directions to each other, the magnetic fields cancel out each other without generating inductive reactance. In other words, the first coil 131E and the second coil 132E are resistors that do not have inductive reactance (for example, only have resistance of the coils) or only have inductance resulting from small leakage inductance. Stated another way, the first coil 131E and the second coil 132E form a substantially non-inductive resistor so as to achieve functions required by the external circuit 300 (for example, limiting currents, reducing attenuated frequency responses, etc.).

Similarly, in some embodiments, start terminals (that is, the third start terminal TF1 and the fourth start terminal TF3) of the coils (that is, the third coil 131F and the fourth coil 132F) of the fourth coil winding (that is, the coil winding 130F) are coupled to each other, and when a current flows into the end terminal (for example, the third end terminal TF2 or the fourth end terminal TF4) of one of the coils of the fourth coil winding, the coils of the fourth coil winding form a non-inductive resistor through the current. Here, since the third coil 131F and the fourth coil 132F form the non-inductive resistor in the same manner as the first coil 131E and the second coil 132E, for brevity of the present disclosure, details are not described herein.

It can be seen from the above that the hybrid inductive device 100 has a simple coil winding structure, and therefore can be implemented by automatic winding through a winding machine, thus improving the production efficiency of the product and reducing the mutual interference between the coil windings.

Therefore, according to some embodiments, a plurality of coil windings are wound on a single magnetic core, and a winding direction of each of the coil windings is different from winding directions of the adjacent coil windings, so that when a current is generated, a common mode inductor, a differential mode inductor, or a non-inductive resistor is formed by a combination of different coil windings, thus reducing a size of a circuit of a line filter and reducing occupied internal space of the line filter, thereby meeting the requirements for miniature line filters.

What is claimed is:
1. A hybrid inductive device, comprising:
a magnetic core having four winding areas; and
four coil windings,
wherein
a first one of the coil windings is wound in a first one of the winding areas,
a second one of the coil windings is wound in a second one of the winding areas,
a third one of the coil windings is wound in a third one of the winding areas, and
a fourth one of the coil windings is wound in a fourth one of the winding areas; wherein,
the second one of the winding areas is between the first one of the winding areas and the third one of the winding areas,
the fourth one of the winding areas is between the first one of the winding areas and the third one of the winding areas,
the second one of the winding areas and the fourth one of the winding areas are at two opposite sides of the magnetic core, and
the first one of the winding areas and the third one of the winding areas are at another two opposite sides of the magnetic core;
wherein, a gap is between the coil windings in two adjacent winding areas, a winding direction of the coil winding in each of the winding areas on the magnetic core is different from winding directions of the coil windings in the adjacent winding areas on the magnetic core, and the coil winding in each of the winding areas is symmetrical to the coil windings in the adjacent winding areas; and
wherein,
a second terminal of the first one of the coil windings is coupled to a second terminal of the second one of the coil windings,
the second terminal of the first one of the coil windings is adjacent to the second terminal of the second one of the coil windings,
a first terminal of the first one of the coil windings is a current input terminal,
a first terminal of the second one of the coil windings is a current output terminal, and
the first one of the coil windings and the second one of the coil windings form a non-inductive resistor when currents flow from the first terminal of the first one of the coil windings to the first terminal of the second one of the coil windings.

2. The hybrid inductive device according to claim 1, wherein the four coil windings all have a same number of coil turns.

3. The hybrid inductive device according to claim 1, wherein the magnetic core is a closed magnetic core or a non-closed magnetic core.

4. The hybrid inductive device according to claim 3, wherein the closed magnetic core is a circular magnetic core, an elliptical magnetic core, or a rectangular magnetic core.

5. The hybrid inductive device according to claim 1, wherein
- the first terminal of the first one of the coil windings is adjacent to a first terminal of the fourth one of the coil windings,
- the first terminal of the fourth one of the coil windings is the current input terminal,
- a second terminal of the fourth one of the coil windings is the current output terminal, and
- the first one of the coil windings and the fourth one of the coil windings form a common mode inductor when currents flow from the first terminal of the first one of the coil windings to the second terminal of the first one of the coil windings and flow from the first terminal of the fourth one of the coil windings to the second terminal of the fourth one of the coil windings.

6. The hybrid inductive device according to claim 1, wherein
- the winding direction of the first one of the coil windings and the winding direction of the third one of the coil windings are parallel and opposite to each other,
- a first terminal of the third one of the coil windings is adjacent to the first terminal of the second one of the coil windings,
- the first terminal of the third one of the coil windings is the current input terminal,
- a second terminal of the third one of the coil windings is the current output terminal, and
- the first one of the coil windings and the third one of the coil windings form a differential mode inductor when currents flow from the first terminal of the first one of the coil windings to the second terminal of the first one of the coil windings and flow from the first terminal of the third one of the coil windings to the second terminal of the third one of the coil windings.

\* \* \* \* \*